United States Patent [19]

Grade et al.

[11] Patent Number: 4,874,526
[45] Date of Patent: Oct. 17, 1989

[54] TREATMENT OF WATER

[75] Inventors: Reinhardt Grade, Bensheim, Fed. Rep. of Germany; Brien M. Thomas, Stockport, England

[73] Assignee: Ciba-Geigy Corporation, Ardsley, N.Y.

[21] Appl. No.: 199,224

[22] Filed: May 26, 1988

Related U.S. Application Data

[63] Continuation-in-part of Ser. No. 122,555, Nov. 12, 1987, abandoned, which is a continuation of Ser. No. 992,826, Oct. 22, 1986, abandoned, which is a continuation of Ser. No. 559,840, Dec. 9, 1983, abandoned, which is a continuation of Ser. No. 382,062, May 26, 1982, abandoned.

[30] Foreign Application Priority Data

May 30, 1981 [GB] United Kingdom ............... 8116589

[51] Int. Cl.$^4$ ............................................. C02F 5/14
[52] U.S. Cl. .................................. 210/697; 210/699; 210/700; 210/701; 210/755; 210/764; 71/67; 252/180; 422/15; 422/28; 422/17; 514/129; 514/139
[58] Field of Search ............... 71/67; 162/161, 190; 210/755, 764, 699, 700, 728, 697, 701; 252/106, 107, 180, 181; 422/28, 15–19; 514/129, 139

[56] References Cited

U.S. PATENT DOCUMENTS

| | | | |
|---|---|---|---|
| 3,281,365 | 10/1966 | Moedritzer | 252/107 |
| 3,364,107 | 1/1968 | Berenson et al. | 210/764 |
| 3,531,514 | 9/1970 | Redmore | 260/478 |
| 3,652,677 | 3/1972 | Redmore | 260/606.5 |
| 3,664,807 | 5/1972 | Redmore | 21/2.5 |
| 3,810,834 | 5/1974 | Jones et al. | 210/58 |
| 3,839,008 | 10/1974 | Shema et al. | 71/67 |
| 3,998,754 | 12/1976 | Oswald | 71/67 |
| 4,017,610 | 4/1977 | Baker | 424/204 |
| 4,126,549 | 11/1978 | Jones et al. | 210/58 |
| 4,188,380 | 2/1980 | Oswald | 424/198 |
| 4,237,090 | 12/1980 | De Mon brun et al. | 252/180 |
| 4,264,593 | 4/1981 | Sukman | 424/198 |
| 4,673,509 | 6/1987 | Davis et al. | 210/764 |
| 4,725,587 | 2/1988 | Whitekette et al. | 210/764 |

FOREIGN PATENT DOCUMENTS 0066544 12/1982 European Pat. Off. ............ 210/764

OTHER PUBLICATIONS

Hueck et al., *Applied Microbiology*, 14, 308, 1965.
Carisle Chemical Works, Inc. Data Sheet–"Car-Ban PQ-612" Biostat, 1968.
Burdon et al., *Microbiology*, 6th Edition The MacMillan Co., N.Y. 1968, pp. 302–303.

*Primary Examiner*—Peter Hruskoci
*Attorney, Agent, or Firm*—Harry Falber

[57] ABSTRACT

A process for treating water which comprises adding to the water (a) from 1 to 50 ppm of a phosphonium compound of the formula:

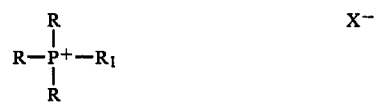

in which R represents $C_1$–$C_6$ groups which are unsubstituted or substituted by a cyano, hydroxy, esterified hydroxy or aryl group, $R_1$ represents a $C_8$–$C_{18}$ alkyl group and X represents chlorine or bromine, and optionally (b) from 0.1 to 100 ppm of an anionic water treatment agent such as a scale or corrosion inhibiting agent.

7 Claims, 7 Drawing Sheets

TREATMENT OF WATER

RELATED APPLICATIONS

This is a continuation-in-part of application Ser. No. 122,555, filed Nov. 12, 1987; which in turn is a continuation of application Ser. No. 992,826, filed Oct. 22, 1986; which in turn is a continuation of Ser. No. 559,840, filed Dec. 9, 1983; which in turn is a continuation of Ser. No. 382,062, filed May 26, 1982; all of said prior applications being abandoned.

The present invention relates to the treatment of water with compounds having microbiological activity.

Various nitrogen-containing compounds, particularly quaternary ammonium compounds, amines and diamines are well known as biologically active chemicals and, on the basis of their broad-spectrum activity against bacteria, fungi and, particularly, algae, are used in industrial cooling water systems and water-using processes to control microbiological growth.

The types of nitrogen-containing compounds used include:

(alkyldimethylbenzylammonium chloride) which has been used as an industrial cooling water biocide, as a swimming pool algicide or as a commercial and household disinfectant; and (dialkyldimethylammonium chloride) which has found use as an industrial cooling water biocide or in petroleum production as a biocide; and alkylated diamines which have been employed in petroleum production as biocides and also used to improve the bacteriological activity of other biocides used in industrial cooling waters.

One disadvantage of the currently used nitrogen based compounds is that they exhibit surface active properties and in use can give rise to foam formation, particularly in areas of high agitation, such as cooling towers, so that their use level has to be carefully controlled.

Nitrogen-containing biocides are also readily adsorbed from water onto surfaces with a resultant reduction in concentration in the aqueous phase. This adsorption can occur when these biocides are applied to waters containing large quantities of biological matter in the form of suspended cells or slime masses. The resultant loss of product from solution means that insufficient biocides will be available to cope with the large number of active organisms present and the sensitivity of the biocidal activity of this type of chemical to the presence of high levels of organisms is well known.

An objective of the water treatment of industrial cooling water systems is to prevent the fouling of heat exchange surfaces which could result in inefficient operation of the system. This fouling can be caused by the deposition of a variety of materials including inorganic scales, corrosion debris and microbiological debris, and it is normal to treat these systems with a combination of chemicals so as to prevent the build-up of such deposits or to facilitate their removal. Hence, it is common practice to treat a system with both a scale or corrosion inhibitor together with a biocide. The majority of scale or corrosion inhibitor formulations used today will contain an anionic chemical usually of the polyacrylate, polymaleate, polyphosphate or phosphonate type.

A major disadvantage of the cationic, nitrogen-containing biocides listed above is that, when they are used in conjunction with scale or corrosion inhibitors containing anioic chemicals, there is a possibility of reaction occurring between the two oppositely-charged antifoulants, resulting in a loss in activity of both products for their desired function. This situation has led to restrictions in the type of chemicals which can be used to treat industrial systems.

Phosphonium compounds are known chemicals which, like their nitrogen-based equivalents, possess biological activity. However, in the past they have been described for use mainly as antiseptic detergents on the basis of their high surface activity combined with their good biological effectivity. U.S. Pat. No. 3,281,365 states that a bacteriostatic agent which also exhibits surface active properties and thereby aids the detergent in the cleaning action would represent an advancement in the art of antiseptic detergent compositions. Numerous quaternary phosphonium halides are described as useful in such detergent compositions. One specific phosphonium compound, triphenyl dodecyl phosphonium chloride, sold under the Trade Name CAR-BAN PQ 612 has been proposed as a biocide for use in industrial cooling water. However, at the level of use needed for adequate biocidal activity, this compound presents problems with foaming because of its surface active properties.

We have now found a specific group of quatenary phosphonium compounds which are biologically active, exhibit surface active properties, in that they reduce the surface tension of water, but surprisingly give rise to much less foam formation than the currently available nitrogen-based compounds, and can be used in smaller amounts than triphenyl dodecyl phosphonium chloride.

The phosphonium compounds are very active against anaerobic bacteria, particularly sulphate-reducing bacteria which can cause severe corrosion due to the production of hydrogen sulphide. The phosphonium compounds are also active against algae and surprisingly and more active than triphenyl phosphonium compounds such as that mentioned above - triphenyl dodecyl phosphonium chloride.

The high surface activity of the phosphonium compounds conbined with their low foaming properties makes them ideal products of the cleaning of fouled systems and for combination with other biocides.

A further advantage in the use of this specific group of phosphonium compounds, compared to the currently available nitrogen based compounds, is that the biological activity of the compounds against microorganisms, is not as sensitive to the presence of large numbers of these organisms, as are their nitrogen-containing equivalents.

Still further, this group of phosphonium compounds has much less effect on the activity of anionic materials and, therefore, can be used in combination with modern scale and corrosion control treatments to prevent biological growths within the system.

Accordingly, the present invention provides a process for treating water which comprises adding to the water (a) from 1 to 50 ppm of a phosphonium compound of the formula:

in which R represents $C_1-C_6$ alkyl groups, which are unsubstituted or substituted by a cyano, hydroxy, esterified hydroxy or aryl group, $R_1$ represents a $C_8-C_{18}$ alkyl group, and X represents chlorine or bromine, and optionally, (b) from 0.1 to 100 ppm of an anionic water treatment agent.

Examples of anionic water treatment agents which may be used include scale and corrosion inhibiting agents such as polyacrylates, polymethacrylates, polyphosphates, phosphonates, aminophosphonates, polymeric carboxylic acids, such as the hydrolysed polymaleic acid anhydride described in British Patent Specification No. 1369429 and co- and ter-polymers of such acids with one or more other monomers, such as those described in British Patent Specification No. 141918, nitrites, molybdates, silicates, phosphino and phosphono carboxylic acids, phosphates and substituted polyacrylates.

The amount of scale or corrosion inhibiting agent used is preferably from 0.5 to 20 ppm, more preferably from 0.5 to 10 ppm.

The phosphonium compounds may also be used in conjunction with other known water treatment products such as dispersants, threshold agents, biocides, non-ionic and cationic scale and corrosion inhibitors. Examples of such products are:- alkylene oxide condensation products, condensed naphthalene sulphonates, sulphonated polystyrene polymers and co-polymers, amines, quaternary ammonium compounds, chlorine and chlorine release agents, chlorophenols, sulphones, brominated propionamides, triazines, methylene bisthiocyanates and azoles.

When radical R is an unsubstituted alkyl group, it may be a straight or branched chain alkyl group, such as methyl, ethyl, n-propyl, isopropyl, n-butyl, sec-butyl, n-amyl and n-hexyl.

When R is a substituted alkyl group it may be e.g. hydroxymethyl, cyanoethyl, benzyl or an acyloxyalkyl group such as acetoxyethyl.

Preferably R is an alkyl group.

The radical $R_1$ may be a straight or branched chain alkyl group, such as n-octyl, n-decyl, dodecyl, tridecyl, tetradecyl, hexadecyl and octadecyl. $R_1$ may also be a mixture of these radicals.

Examples of suitable phosphonium compounds are: tri-n- butyl tetradecyl phosphonium chloride, tri-n-butyl tetradecyl phosphonium bromide, tri-n-butyl dodecyl phosphonium chloride, triacetoxymethyl tetradecyl phosphonium chloride, trihydroxymethyl octadecyl phosphonium chloride, tricyanoethyl heptyl phosphonium bromide and tribenzyl tetradecyl phosphonium chloride.

The amount of phosphonium compound used is preferably from 10 to 50 ppm, more preferably from 10 to 30 ppm.

The present invention is further illustrated by the following Examples.

Example 1

The effect of the number of organisms present on the biological activity of tri-n-butyl tetradecyl phosphonium chloride was compared with that for various quaternary ammonium compounds. This was done by measuring the MKC value i.e. the minimum concentration (expressed in ppm active ingredient) of chemical required to kill a given number or organisms. In the test carried out, a suspension of a mixed culture of bacteria containing the following slime-forming organisms:

Escherichia coli
Bacillus cereus
Staphyloccocus aureus
Pseudomonas aeruginosa
Enterobacter aerogenes
Proteus vulgaris was diluted to give suspensions containing $10^6$/ml (A), $10^5$/ml (B) and $10^4$/ml (C) bacteria. These suspensions were then exposed to varying concentrations of the biocides for 5 hours and the MKC value measured. The results in Table 1 show that the high activity of the phosphonium compound in not reduced at high levels of bacterial contamination whilst the nitrogen-containing biocides are.

TABLE 1

| Compound | MKC (ppm) | | |
| --- | --- | --- | --- |
| | A | B | C |
| Alkyloligoamide (Ferrocid ® 591 | 100 | 25 | 12.5 |
| Alkyl dimethyl benzyl ammonium chloride (Barquat ® MA-100) | 50 | 25 | 12.5 |
| Dimethyl di-n-decyl ammonium chloride | 25 | 25 | 12.5 |
| Soya trimethyl ammonium chloride | >100 | >100 | 12.5 |
| Mixed alkyl dimethyl ammonium chloride (Bardac ® 20) | 50 | 50 | |
| Tri-n-butyl tetradecyl phosphonium chloride | 12.5 | 12.5 | 12.5 |

Example 2

Figure 8:
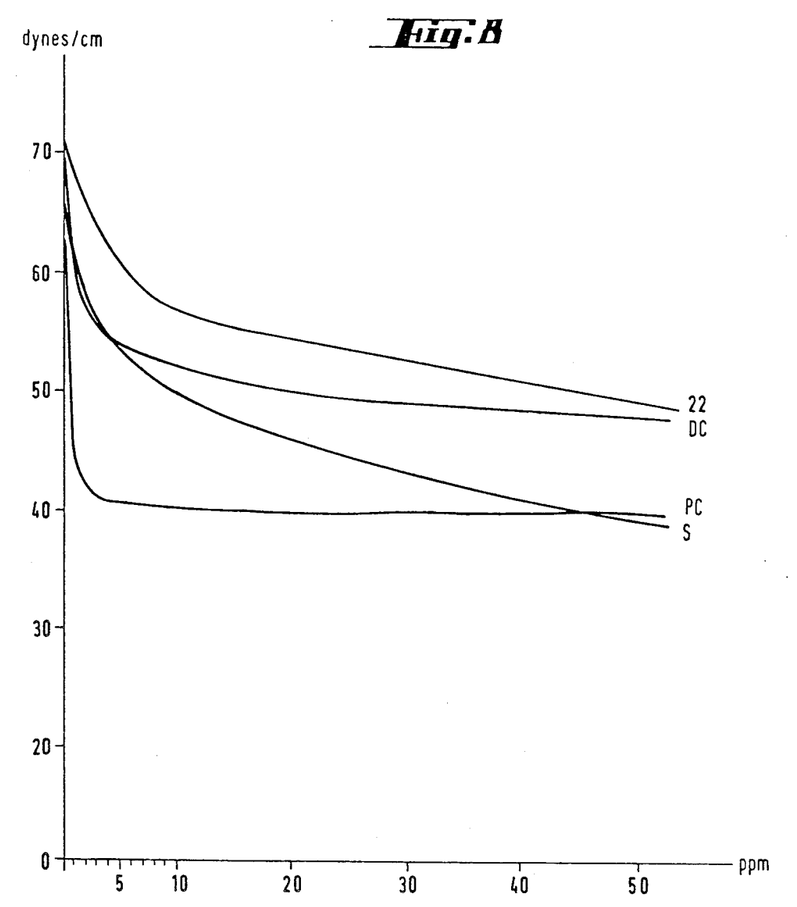

The surface activity of the following compounds was measured by determining the surface tension of dilute aqueous solutions of the chemicals:

(a) soya trimethyl ammonium chloride (S)
(b) dimethyl di-n-decyl ammonium chloride (22)
(c) tri-n-butyl tetradecyl phosphonium chloride (PC)
(d) tri-n-butyl dodecyl phosphonium chloride (DC),
FIG. 8 shows the high surface activity of PC and DC, particularly in comprison with 22.

However, this high surface activity of the phosphonium compounds surprisingly does not give rise to excessive foaming tendencies. Table 2 shows the height of foam after various times as measured in the standard Ross-Miles foam test using the same four chemicals (a) to (d). It can be seen that PC and DC both produce much less foam than S or 22.

TABLE 2

| Time (minutes) | Foam Height (mm) | | | |
|---|---|---|---|---|
| | S (0.05%) | 22 (0.05%) | PC (0.05%) | DC (0.05%) |
| 1 | 63 | 45 | 33 | 18 |
| 30 | 55 | 40 | 19 | 6 |
| 60 | 51 | 38 | 10 | 4 |

Example 3

To a solution of calcium nitrate in distilled water (1.470 g/liter) were added various amounts of hydrolysed polymaleic anhydride (PMA; as the commercially-available material "Belgard ® EV") a well known scale inhibiting chemical, and various amounts of tri-n-butyl tetradecyl phosphonium chloride (PC).

One of the standard laboratory tests employed to determine the scale inhibiting properties of chemicals is the so-called 'Threshold Test'. This test involves measuring the ability of the chemical(s) under investigation to suppress the precipitation of calcium carbonate from a solution supersaturated with $Ca^{++}$ and $CO_3^{--}$ ions.

Figure 1:
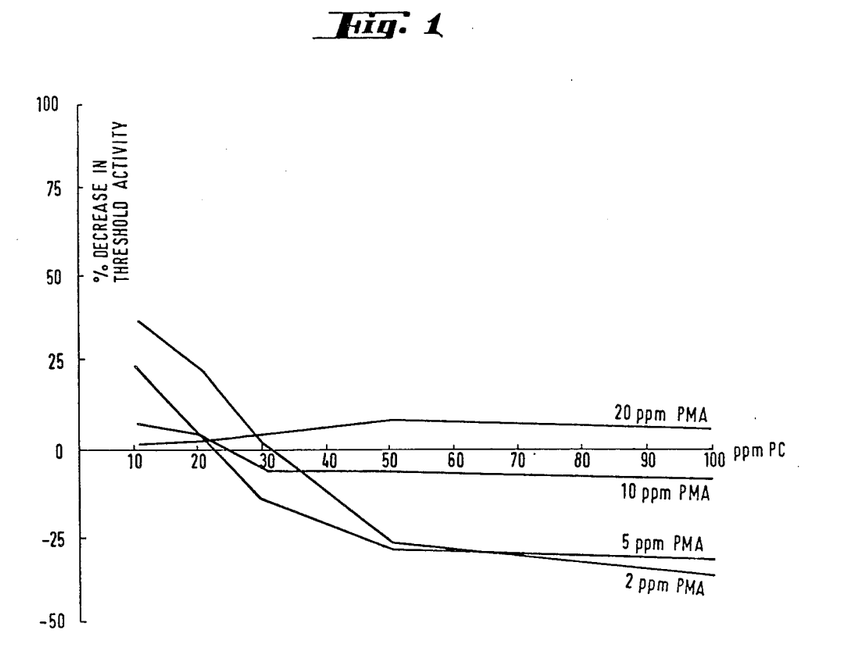
FIGS. 1-8 show graphically the test results of the instant Examples.

The effect of PMA against calcium carbonate precipitation was determined (Threshold test) by adding to the resulting solution the same volume of sodium carbonate solution (0.646 g/liter). The mixture was stored for 24 hours at 25° C. and then the calcium remaining in solution was determined by EDTA titration. The results are expresed as percentage inhibition of calcium carbonate precipitation as compared to a blank containing no additives. The results are shown in FIG. 1.

Figure 2:
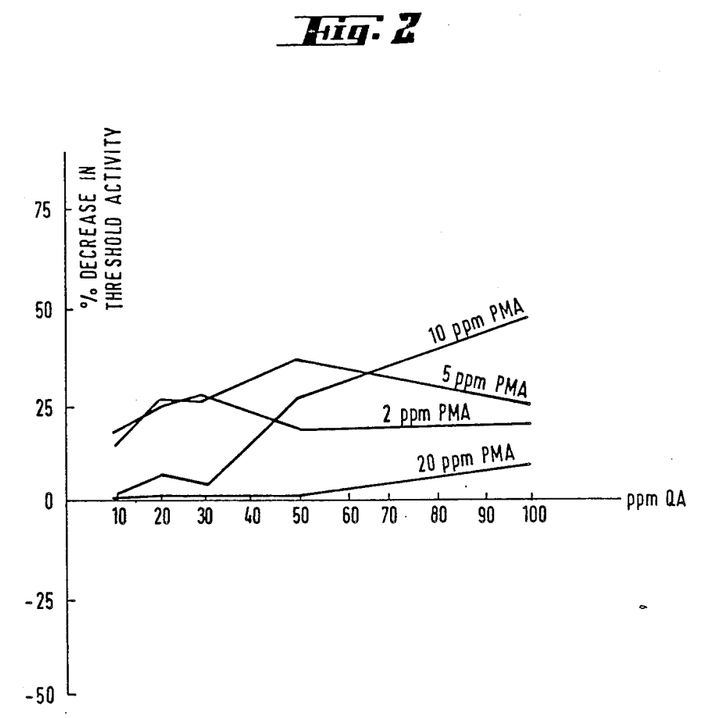
Figure 3:
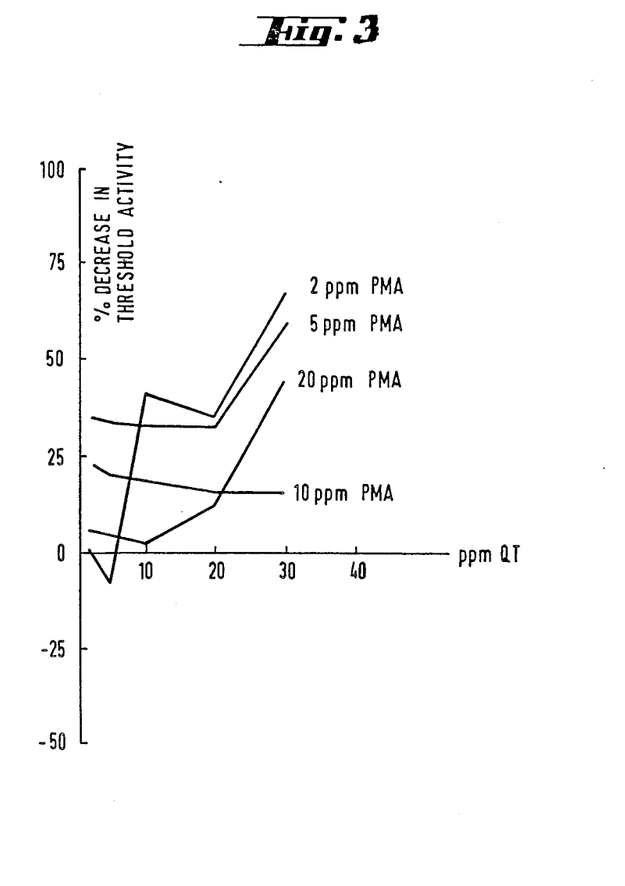
Figure 4:
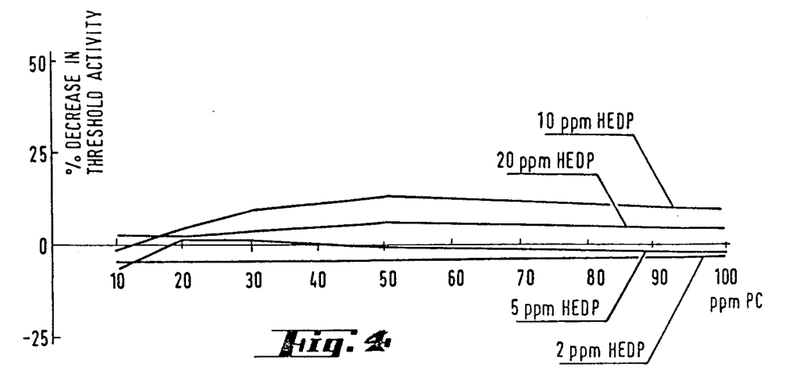
Figure 5:
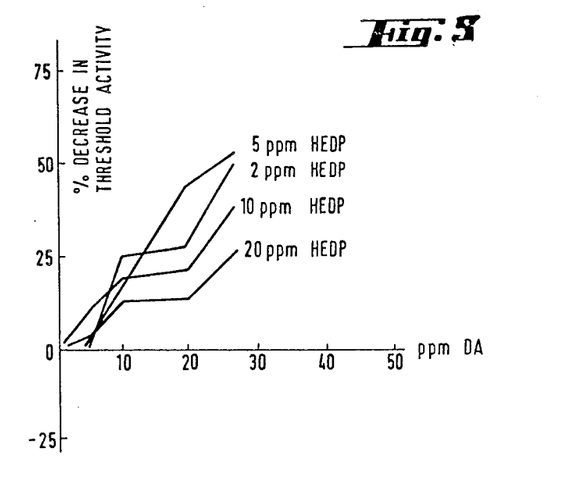
Figure 6:
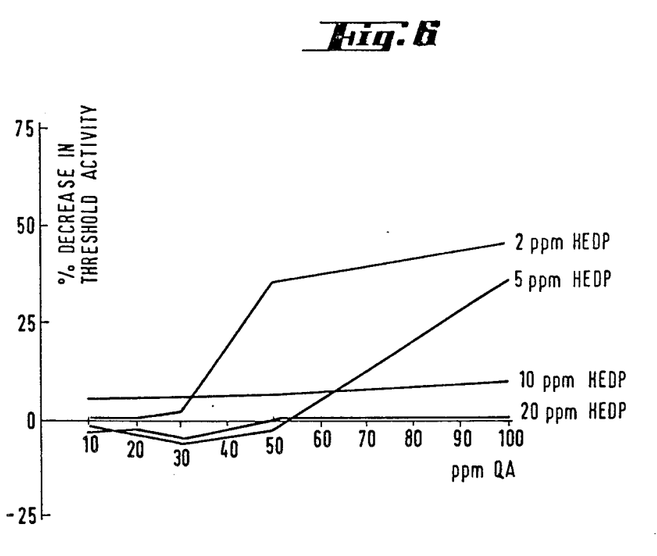
Figure 7:
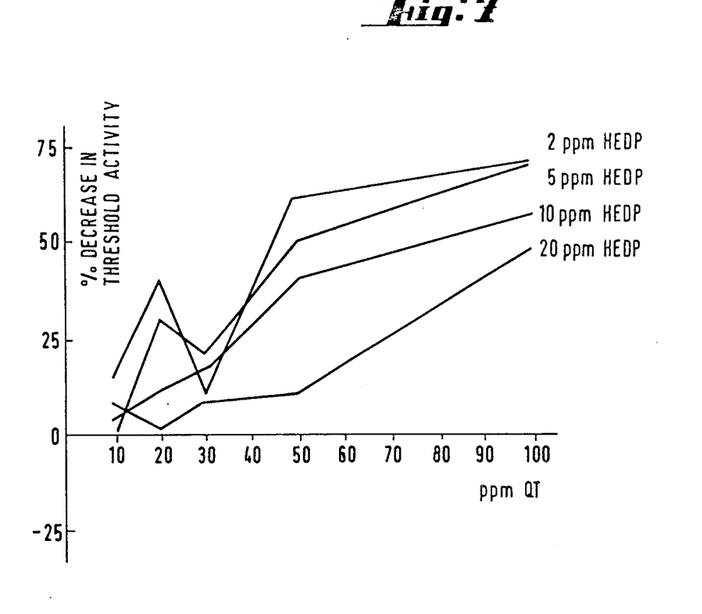

The above test was repeated using a quaternary-ammonium compound, dimethyl benzyl dodecyl ammonium chloride (QA) and QA plus tributyl tin oxide (QT), which constitutes a typical quaternary-ammonium based biocide formulation, in place of the PC. The results are shown in FIGS. 2 and 3.

It can be seen that the effect of PC on the activity of PMA is much less than the effect of QA or QT and at some concentrations of PC the effect of PMA in the Threshold test is actually enhanced.

Example 4

Example 3 was repeated using 1,1-hydroxyethylidene diphosphonic acid (HEDP) instead of PMA. The phosphonium compound was again PC but the comparison compound was the commercially-available $C_{12}H_{25}NH(CH_2)_3NH_2$ (DA) as well as QA and QT.

The results are shown in FIGS. 4–7, from which it can be seen that the effect of PC on the activity of HEDP is much less than that on the other compounds used.

Example 5

The high activity of the selected phosphonium compounds against algae, which increases their effectivity in controlling the fouling of industrial cooling water, is illustrated in the following tests:

Cultures of the following strains of algae were grown in algae nutrient medium over a period of 14 days:
(a) Oscillatoria geminata
(b) Phormidium foveolarum
(c) Chlorella vulgaris
(d) Scenedesmus spec.

The algae was diluted (1 to 200) in further algae medium and the phosphonium compounds added to give final concentrations of 1, 2.5, 3.4 and 6.8 ppm active ingredient. The algal suspensions were then incubated in a shaking water bath at 18° C., with a daily cycle of 14 hours light and 10 hours darkness. The suspensions were assessed visually for growth of algae and the Minimum Inhibition Concentration (MIC) was recorded as the lowest concentration of product at which there was no growth for each algal strain. A similar experiment was also carried out using a mixed algal culture including strains a to d together with the following strains:
Nostoc spec.
Anacystis nidulans
Chlorella pyrenoidosa
Ulothrix subtilissima
Tribonema aequale In this experiment the concentrations of phosphonium compounds present were 2, 5, 7.5 and 10 ppm.

The phosphonium compounds tested were:
tri-n-butyl tetradecyl phosphonuim chloride
tri-n-butyl tetradecyl phosphonium bromide, and
tri-phenyl dodecyl phosphonium chloride.

The results shown in Table 3 indicate the high algistatic properties of the phosphonium compounds, especially the tri-n-butyl derivatives.

TABLE 3

| Phosphonium Compound | MIC (ppm) Algal Strain | | | | |
|---|---|---|---|---|---|
| | a | b | c | d | Mixed culture |
| Tri-n-butyl tetradecyl phosphonium chloride | 2.5 | 1 | 1 | 1 | 5* |
| Tri-n-butyl tetradecyl phosphonium bromide | 2.5 | 1 | 1 | 1 | 2 |
| Tri-phenyl dodecyl phosphonium chloride | 2.5 | 1 | 2.5 | 3.4 | 7.5 |

N.B. *At 2 ppm only strain (a) grew; at 5 ppm none of the strains grew.

Example 6

The compounds below were tested in circulation systems, set up on a roof, and consisting of the following:
1. A plastic barrel having a volume of 113 liters.
2. A Siemens pump (21 liters/minute delivery at a delivery hight of 3 meters).
3. A cooling tower with Oreogn pine heartwood, oak, spruce, asbestos cement and PVC panels.

120–124 liters of make-up water were added daily to achieve a half-life in the system of about one day.

The systems were inoculated naturally with airborne dust, spores and pollen.

The systems were treated with compound to be tested on the first day then on day 7, day 21 and over 45 days. The number of germs/ml of water in the system is measured before and 3 hours after addition of the compound being tested.

The results are as follows:

| Biocide | Survival rate of germs 3h after biocide addition (%) and time of testing (days) | | | |
|---|---|---|---|---|
| | 0 d | 7 d | 21 d | >45 d |
| Tributyl-tetradecyl-phosphonium chloride | 1 | 9 | 6 | 8 |
| Triphenyl-dodecyl-phosphonium chloride | 3 | 72 | 110 | 130 |

- low survival rate values correspond to a good biocidal activity
- high survival rate values correspond to a poor or no biocidal acitivity
- values higher than 100% correspond to a situation of growth in spite of biocide treatment The germ count was carried out by standard serial dilution and plating out on Agar nutrient and, afer incubation, counting the bacterial colonies present on the surface.

In each case the dosage of compound added was 20 ppm active ingredient.

The results show that every dosage of the compound of the invention reduced the germ count by more than 90% while the prior art compound only did this after the first dose, but thereafter hid little or no effect, allowing bacteria to grow after 21 days.

The effect of respective test compounds on the surface tension of water was also determined, the results being shown in the following Table:

Reduction of the surface tension.

| Concentration (mg/l) | Surface tension (dynes/cm) | |
|---|---|---|
| | tributyl-tetradecyl phosphonium chloride | triphenyl-dodecyl phosphonium chloride |
| 5 | 52.9 | 60.2 |
| 10 | 48.8 | 59.5 |
| 15 | 47.1 | 57.9 |
| 20 | 45.6 | 56.4 |
| 30 | 42.3 | 53.7 |

The surface tension of distilled water is 72.8 dynes/cm.

These results show, surprisingly, that the compound of the invention exhibits higher surface-active properties than triphenyl dodecyl phosphonium chloride, in that it reduces by a greater degree the surface tension of water in use concentrations and, moreover, gives no problems of foaming in the cooling system, whereas some foaming problems were encountered with triphenyl dodecyl phosphonium chloride.

The anti-algal effect of the respective test compounds was also examined. It was found that the compound of the invention, tributyl-tetradecyl phosphonium chloride is more active against algae than triphenyl-dodecyl phosphonium chloride. Thus, the compound of the invention when used in an amount of 1 ppm inhibited the algal strains chlorella vulgaris snd scenedesmus spec. (which strains are very significant strains in cooling systems) where 2, 5 or 10 ppm was required when using triphenyl-dodecyl phosphonium chloride.

Example 7

The activity of the phosphonium compounds listed below against three strains of algae is determined according to the procedure set out in example 5. The three strains of algae are:

*Scenedesmus obliquus* (A)
*Tribonema aequale* (B)
*Haematococcus lacustris* (C)

The Minimum Inhibition Concentration (MIC) in mg/l is shown in the following Table.

| Compound | MIC (mg/l) | | |
|---|---|---|---|
| | A | B | C |
| Tri-n-butyl tetradecyl phosphonium bromide | 2 | 0.3 | 2 |
| Tri-n-butyl tetradecyl phosphonium chloride | 2 | 2 | 2 |
| Tri-n-butyl dodecyl phosphonium chloride | 2 | 1 | 1 |
| Triphenyl dodecyl phosphonium chloride | 3 | 3 | 3 |
| Triphenyl tetradecyl phosphonium bromide | 6 | 3 | 6 |

These figures show that the compounds of the invention have a better activity than triphenyl phosphonium compounds.

We claim:

1. A process for treating water to destroy biological growth and prevent fouling of heat exchange surfaces which treatment comprises adding to the water (a) from 1 to 50 ppm of a phosphonium compound of the formula:

in which R represents $C_1$-$C_6$ alkyl groups which are unsubstituted or substituted by a cyano, hydroxy, esterified hydroxy or aryl group, $R_1$ represents a $C_8$-$C_{18}$ alkyl group and X represents chlorine or bromine, and (b) from 0.1 to 100 ppm of an anionic scale or corrosion inhibiting agent selected from the group consisting of polyacrylates, polymethacrylates, polyphosphates, phosphonates, aminophosphonates, polymeric carboxylic acids, co-or ter-polymers of carboxylic acids and one or more other monomers, nitrites, molybdates, silicates, phosphino or phosphono carboxylic acids, and phosphates.

2. A process as claimed in claim 1, in which the radical R is an unsubstituted $C_1$-$C_6$ alkyl group.

3. A process as claimed in claim 1 or 2, in which the radical R is an n-butyl group.

4. A process as claimed in claim 1, in which the amount of phosphonium compound is from 10 to 50 ppm.

5. A process as claimed in claim 4, in which the amount of phosphonium compound is from 10 to 30 ppm.

6. A process as claimed in claim 1, in which the amount of anionic agent is from 0.5 to 20 ppm.

7. A process as claimed in claim 6, in which the amount of anionic agent is from 0.5 to 10 ppm.

* * * * *